US009488715B2

(12) United States Patent
Huard et al.

(10) Patent No.: US 9,488,715 B2
(45) Date of Patent: Nov. 8, 2016

(54) OPTIMIZED MONOTONIC RADIATION PATTERN FIT WITH AMBIGUITY RESOLUTION

(71) Applicant: RAYTHEON COMPANY, Waltham, MA (US)

(72) Inventors: Andrew Huard, Goleta, CA (US);
Amedeo Larussi, Oxnard, CA (US);
Kim McInturff, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 519 days.

(21) Appl. No.: 13/958,240

(22) Filed: Aug. 2, 2013

(65) Prior Publication Data
US 2015/0035696 A1    Feb. 5, 2015

(51) Int. Cl.
| G01S 3/14 | (2006.01) |
| G01S 3/06 | (2006.01) |
| G01S 3/36 | (2006.01) |
| G01S 7/02 | (2006.01) |

(52) U.S. Cl.
CPC .. *G01S 3/14* (2013.01); *G01S 3/06* (2013.01);
*G01S 3/36* (2013.01); *G01S 7/021* (2013.01)

(58) Field of Classification Search
CPC .............. G01S 3/06; G01S 3/14; G01S 3/36; G01S 7/021
USPC ......................................................... 342/147
See application file for complete search history.

(56) References Cited

U.S. PATENT DOCUMENTS

| 4,929,958 | A | 5/1990 | Hodel |
| 8,330,650 | B2 | 12/2012 | Goldman |
| 8,441,626 | B2 | 5/2013 | Wen |
| 2011/0143807 | A1* | 6/2011 | Aue ..................... H04B 7/0413 455/522 |
| 2013/0027251 | A1 | 1/2013 | Lu et al. |

FOREIGN PATENT DOCUMENTS

| EP | 1226450 A1 | 7/2002 |
| EP | 2551696 A2 | 1/2013 |

OTHER PUBLICATIONS

Winfree, "Angle of Arrival Estimation using Received Signal Strength with Directional Antennas", An Honor Thesis, The Ohio State University, 2007, 39 pages.
Alleva, et al., "Digital Antenna Unit for DOA Analysis in ESM systems," Radar Conference (EURAD), Sep. 30, 2010.
Loginov, et al., "Applying Correlation Method to the Problem of Passive Amplitude Monopulse Direction Finding," Communication Software and Networks (ICCSN), May 27, 2011, pp. 66-68.

* cited by examiner

*Primary Examiner* — Timothy A Brainard
(74) *Attorney, Agent, or Firm* — Burns & Levinson LLP; Joseph M. Maraia

(57) ABSTRACT

Characterizing a radiation pattern of an antenna, accurately, is needed to improve the determination of an angle arrival of a radar signal received by the antenna. Accordingly, an optimized monotonic fitting approach with corresponding method and system are provided. The approach represents an approximation of the radiation pattern as a window map having a plurality of windows. The approach finds an optimized monotonic fit of the radiation pattern by adjusting the window map, one window at a time, and testing the resulting new approximations. The approach tests whether a new approximation is a better fit then the other approximations, is monotonic, and has a minimum slope. The approach enforces monotonicity and a minimum slope for ambiguity resolution. The approach further includes calculating an angle arrival of the radar signal based on the optimized monotonic fit.

16 Claims, 13 Drawing Sheets

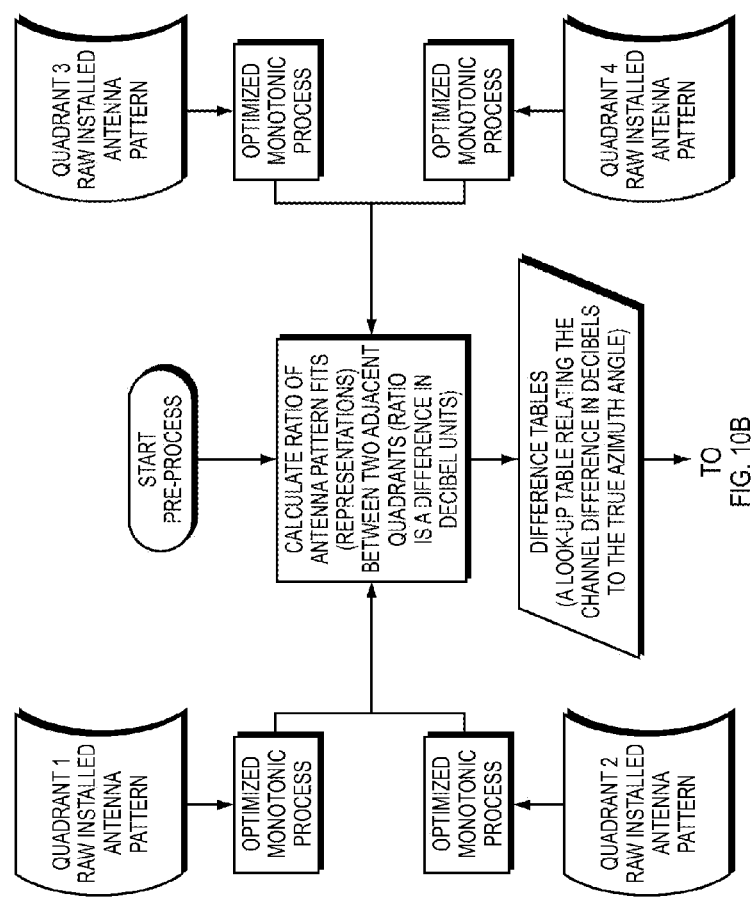

OPTIMIZED MONOTONIC RADIATION PATTERN FIT WITH AMBIGUITY RESOLUTION

BACKGROUND

This disclosure relates generally to the field of radar signal processing, and more particularly to an approach for determining an angle of arrival of a radar signal received from an emitter.

Angle of Arrival (AOA) determination requires an accurate description of the antenna performance over azimuth or elevation angle while avoiding ambiguity. Currently, the standard industry practice is to curve fit the antenna radiation pattern using one of three approaches: pure Gaussian, bi-faceted Gaussian, and Polynomial. One criterion by which radar receivers, such as Radar Warning Receivers, are evaluated is the Root Mean Square (RMS) angular error, which is principally determined by the quality of the radiation pattern and the curve fit. Although prior fitting approaches have been somewhat successful in the past, none have provided a ubiquitous, optimized solution. Accordingly there is a need for a fitting approach that provides a more accurate radiation pattern representation with a smaller RMS error, no ambiguity, and generic pattern fitting capability.

In accordance with an example, a method for determining an angle of arrival of a radar signal received from an emitter is provided. The method includes, in a radar receiver system, given a radiation pattern of an antenna receiving a radar signal from an emitter, in an initial iteration, representing an approximation of the pattern as plurality of windows. Each window is defined by two boundaries. Each of the boundaries having an azimuth angle value and an amplitude value. The approximation further includes an inflexion point. The inflexion point is a boundary having an amplitude value higher than the other boundaries. The method further includes for each of the boundaries, adjusting at least one of a respective azimuth angle value or amplitude value of a subject boundary. The method further includes generating a next approximation of the pattern based on the adjustment to the subject boundary. The method further includes comparing the next approximation to an approximation of the pattern generated in a prior iteration, which includes the initial approximation. The method further includes comparing a slope associated with a portion of the next approximation represented by each window to a non-zero threshold value. The method further includes determining whether the next approximation is constantly increasing on one side of the inflexion point and constantly decreasing on the other side of the inflexion point, and identifying the next approximation as an optimized monotonic fit based on the comparisons and determination. The method further includes calculating an angle of arrival of the radar signal received from the emitter based on the optimized monotonic fit.

In accordance with another example, a system for determining an angle of arrival of a radar signal received from an emitter is provided. The system includes memory having computer executable instructions thereupon and at least one interface receiving a radiation pattern of an antenna that receives a radar signal from an emitter. The system further includes an approximating engine coupled to the memory and the at least one interface. The computer executable instructions when executed by the approximating engine cause the approximating engine to in an initial iteration, represent an approximation of the pattern as plurality of windows. Each window is defined by two boundaries. Each of the boundaries having an azimuth angle value and an amplitude value. The approximation further includes an inflexion point. The inflexion point is a boundary having an amplitude value higher than the other boundaries. The approximating engine further caused to, for each of the boundaries, adjust at least one of a respective azimuth angle value or amplitude value of a subject boundary. The approximating engine further caused to generate a next approximation of the pattern based on the adjustment to the subject boundary. The detecting engine further caused to compare the next approximation to an approximation of the pattern generated in a prior iteration, which includes the initial approximation. The detecting engine further caused to compare a slope associated with a portion of the next approximation represented by each window to a non-zero threshold value. The detecting engine further caused to determine whether the next approximation is constantly increasing on one side of the inflexion point and constantly decreasing on the other side of the inflexion point, and identify the next approximation as an optimized monotonic fit based on the comparisons and determination. The detecting engine further caused to provide the optimized monotonic fit to a radar receiver coupled to the approximating engine. The radar receiver calculates an angle of arrival of the radar signal received from the emitter based on the optimized monotonic fit In accordance with yet another example, a tangible computer-readable storage medium having computer readable instructions stored therein for determining an angle of arrival of a radar signal received from an emitter is provided. The computer readable instructions when executed by one or more processors cause the one or more processors to, given a radiation pattern of an antenna receiving a radar signal from an emitter, in an initial iteration, represent an approximation of the pattern as plurality of windows. Each window is defined by two boundaries. Each of the boundaries having an azimuth angle value and an amplitude value. The approximation further includes an inflexion point. The inflexion point is a boundary having an amplitude value higher than the other boundaries. The one or more processors further caused to, for each of the boundaries, adjust at least one of a respective azimuth angle value or amplitude value of a subject boundary. The one or more processors further caused to generate a next approximation of the pattern based on the adjustment to the subject boundary. The one or more processors further caused to compare the next approximation to an approximation of the pattern generated in a prior iteration, which includes the initial approximation. The one or more processors further caused to compare a slope associated with a portion of the next approximation represented by each window to a non-zero threshold value. The one or more processors further caused to determine whether the next approximation is constantly increasing on one side of the inflexion point and constantly decreasing on the other side of the inflexion point, and identify the next approximation as an optimized monotonic fit based on the comparisons and determination. The one or more processors further caused to provide the optimized monotonic fit to a radar receiver coupled to the approximating engine. The radar receiver calculates an angle of arrival of the radar signal received from the emitter using the optimized monotonic fit.

In some examples, any of the aspects above can include one or more of the following features.

In other examples of the method, adjusting includes increasing or decreasing the azimuth angle value of the subject boundary by a fixed value.

In some examples of the method, adjusting includes randomizing the amplitude value of the subject boundary by a random value.

Other examples of the method further include calculating the random value based on a normal distribution having a mean value equal to that of the given radiation pattern and a standard deviation. The standard deviation is dependent on a magnitude of divergence of the approximation generated in the prior iteration and the given radiation pattern.

In some examples of the method, comparing the next approximation of the pattern further includes computing a least squares error for the next approximation, and selecting the next approximation when the computed least squares error for the next approximation is smaller than a least squares error for the approximation generated in a prior iteration.

In other examples of the method, comparing the slope includes determining whether the slope associated with each portion of the next approximation is greater than the non-zero threshold value.

In some examples of the method, identifying includes returning, as the optimized monotonic fit, the next approximation having a least squares error that is less than a threshold.

The method further includes adding a boundary between boundaries defining a window having a span of azimuth angle values greater than other windows.

In some examples of the method, identifying includes returning, as the optimized monotonic fit, the next approximation having a maximum number of boundaries added.

In some examples of the method, calculating the angle of arrival includes, given radiation patterns of two adjacent antennas, comparing a ratio of optimized monotonic fit of the radiation patterns and a ratio of an effective received power from each of two adjacent antennas and resolving the angle of arrival based on the comparison of ratios.

In other examples of the method, calculating the angle of arrival given adjacent antennas having a first radiation pattern and a second radiation pattern, populating a difference table, directly, with a ratio of a first optimized monotonic fit of the first radiation pattern and a second optimized monotonic fit of the second radiation pattern. The method further includes calculating the angle of arrival of the radar signal based on the difference table.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWINGS

The foregoing and other objects, features and advantages will be apparent from the following more particular description of the examples, as illustrated in the accompanying drawings in which like reference characters refer to the same parts throughout the different views. The drawings are not necessarily to scale, emphasis instead being placed upon illustrating the principles of the examples.

FIGS. 10A-B is a flowchart of an example procedure performed by the radar receiver system.

DETAILED DESCRIPTION

Figure 1:
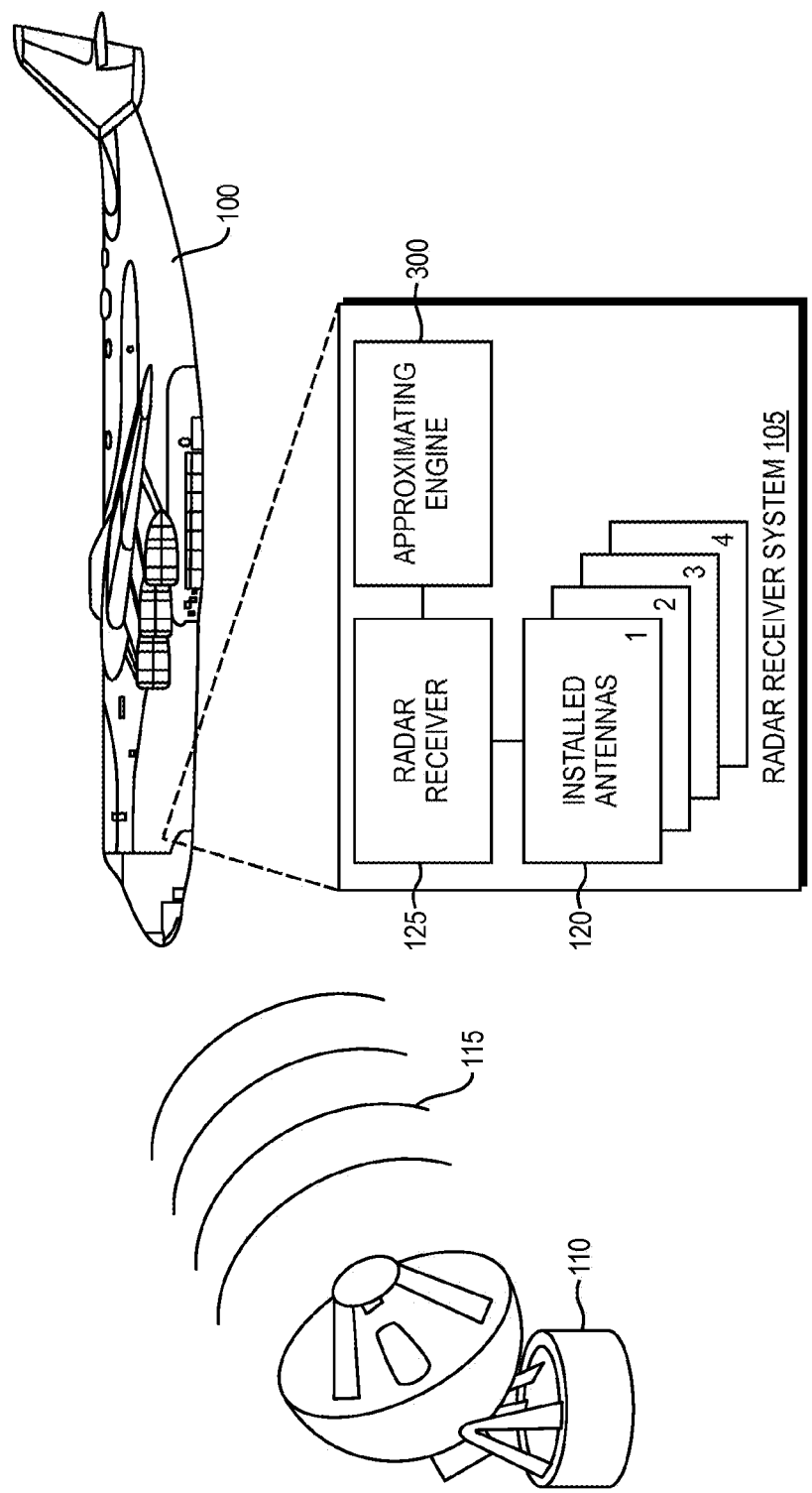
FIG. 1 is a block diagram of an example radar receiver system with an approximating engine.

In the description that follows, like components have been given the same reference numerals, regardless of whether they are shown in different examples. To illustrate an example(s) of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

FIG. 1 shows an example aircraft 100 with a radar receiver system 105 for determining a location of an emitter 110 from an angle of arrival of a radar signal 115 sent from the emitter 110. The radar receiver system 105 includes antennas 120 (typically four) communicatively coupled to a radar receiver 125 to receive and process (e.g., detect) the radar signal 115. How accurate the radar receiver system 105 determines the location of the emitter 110 depends on how well the radiation patterns of the installed antennas 120 (or "radar receiver antenna patterns") are characterized.

Figure 2:
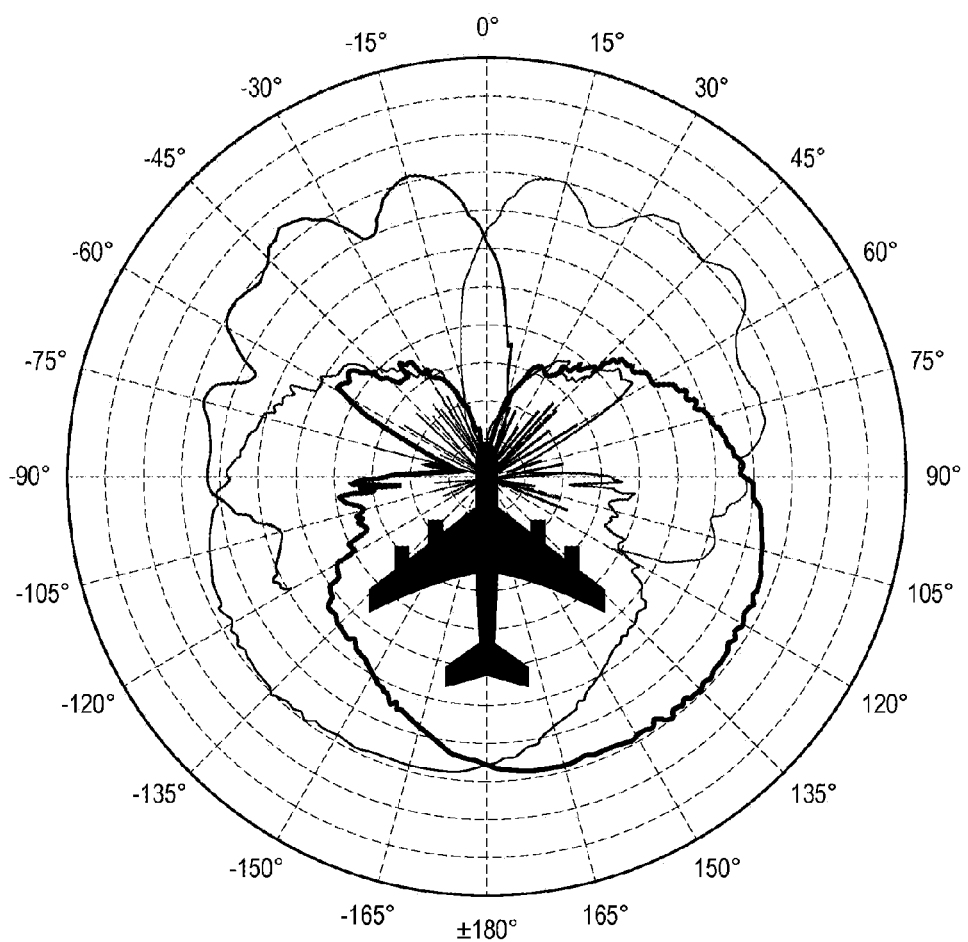
FIG. 2 is a diagram of radiation patterns of antennas installed on an aircraft.
Figure 3:
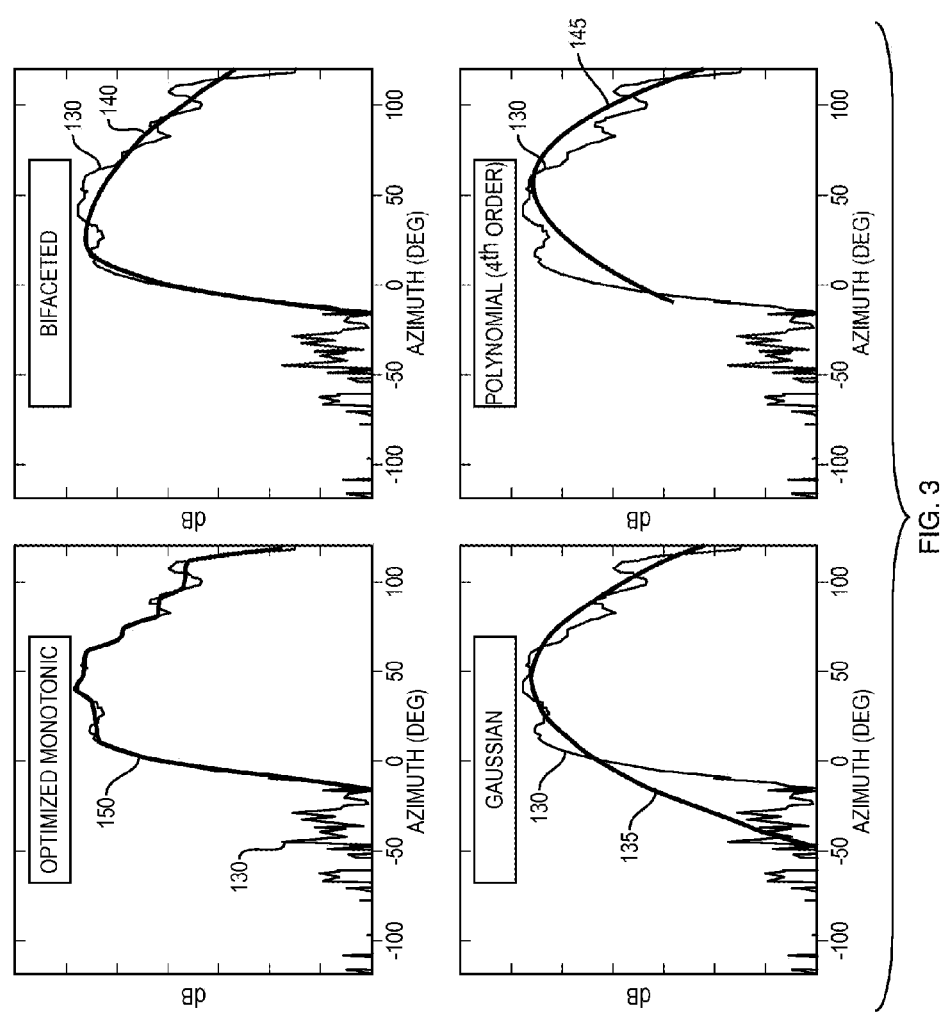
FIG. 3 includes charts showing Gaussian, bi-faceted, polynomial, and optimized monotonic fitting approaches.

FIG. 2 shows typical radiation patterns of the antennas installed on the aircraft. The irregular shapes of the patterns or "pattern perturbations" are due to constructive and destructive interferences caused, primarily, by the structure of the aircraft. Prior approaches to characterizing or approximating a radar receiver antenna pattern include Gaussian, bi-faceted, and polynomial. FIG. 3 shows a Gaussian approximation 135, bi-faceted approximation 140, and polynomial approximation 145 of a radiation pattern 130, respectively.

Figure 4:
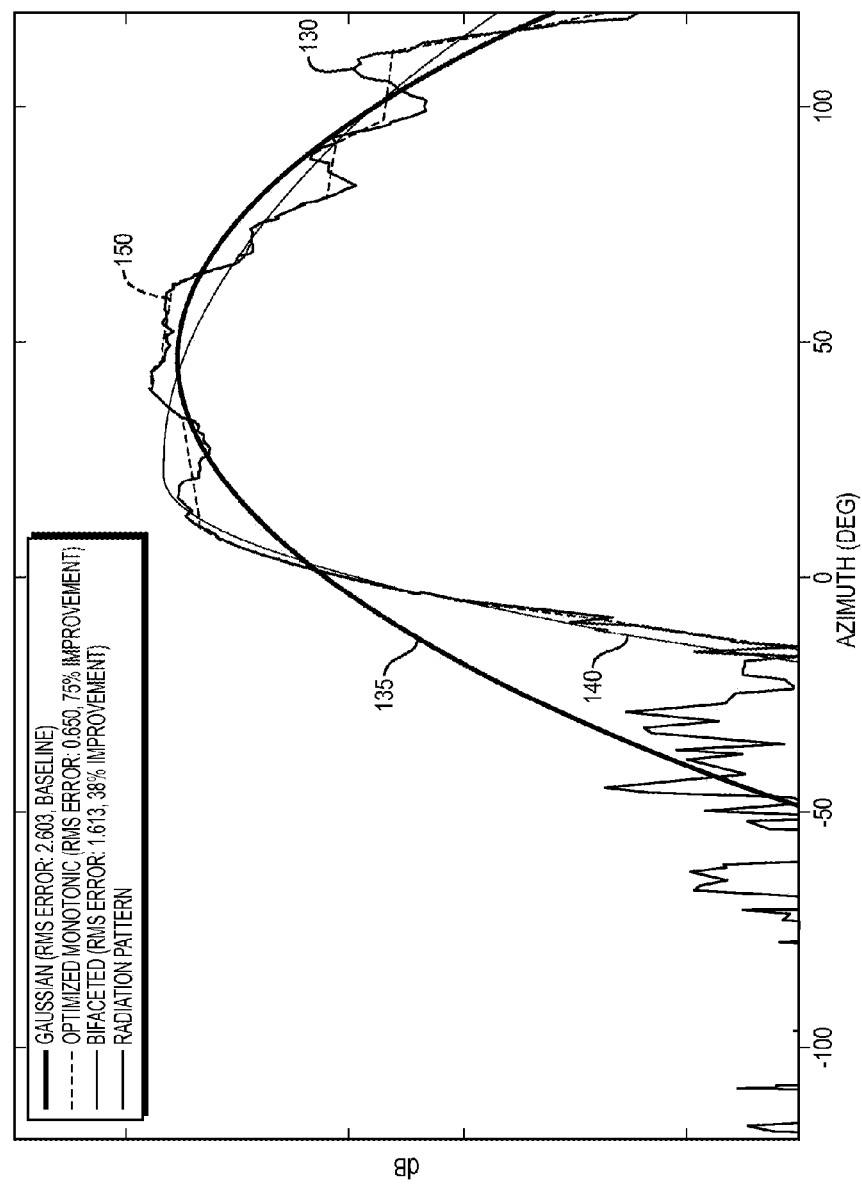
FIG. 4 is a chart comparing the performance of Gaussian, bi-faceted, and optimized monotonic fitting approaches.

FIG. 4 shows how well the Gaussian, bi-faceted, and polynomial approaches approximate or "fit" the radiation pattern, as quantified by the root mean square (RMS) error of their respective approximations. As shown, the Gaussian approximation 135 is the "poorest" fit to the radiation pattern 130 (i.e., having the highest RMS error of the approximations). The Gaussian approximation 135 serves as a baseline for comparing the bi-faceted approximation 140. As shown, when compared to the Gaussian approximation 135, the bi-faceted approximation 140 is a "better" fit to the radiation pattern 130 (i.e., having an RMS error less than the Gaussian approximation). An investigation of the Gaussian, bi-faceted, and polynomial fits as well as other fitting types, however, reveals that these prior approaches adapt only to a limited variety of possible radar receiver antenna patterns. This limitation results in large angle of arrival errors at discrete frequencies. Such errors can manifest itself in a number of ways. For example, the radar receiver system 105 may indicate to a pilot that the emitter (e.g., enemy radar) is located in front the plane, momentarily, and then behind the plane the next moment. This could confuse the pilot and possibly put the pilot into a dangerous situation.

In contrast, an optimized monotonic approach, discussed herein, is specifically developed to describe a greater variety of radar receiver antenna patterns than with the aforementioned approaches. The approach provides substantial improvements to AOA accuracy. It further provides ambiguity resolution by avoiding multiple intercept solutions by the radar receiver, which is a significant advantage over the prior approaches. The approach also provides the capability to develop accurate radar receiver look-up tables for individual polarizations, which also improves AOA performance.

Continuing with FIG. 1, the radar receiver system 105 includes an approximating engine 300 communicatively coupled to the radar receiver 125. The approximating engine 300 generates an approximation or fit of the radiation pattern called an "optimized monotonic fit." In turn, the radar receiver system 105 calculates the angle of arrival of the radar signal and determines the location of the emitter, either in whole or in part, based on the optimized monotonic fit. With reference to FIG. 3 and FIG. 4, both a visual and RMS error comparisons of the different approximations show that the optimized monotonic fit approximates the radiation pattern better than the Gaussian, bi-faceted, and polynomial approximations.

Figure 5:
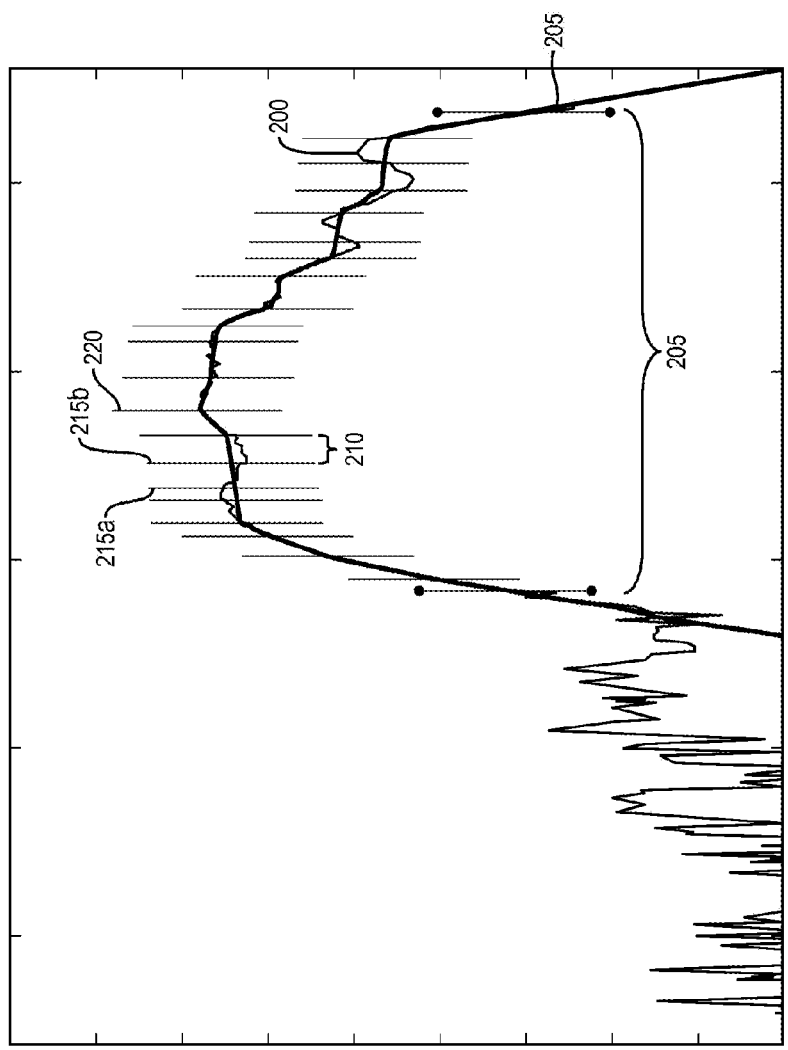
FIG. 5 is a chart showing a window map of the optimized monotonic fitting approach.

With reference to FIG. 5, the approximate engine represents an approximation of a given radiation pattern 200 as a window map 205. The window map 205 includes a plurality of windows 210. Each window is defined by two boundaries 215a and 215b. Each of the boundaries has an associated azimuth angle value and an amplitude value. The window map 205 further includes an inflexion point 220. The inflexion point 220 is a boundary with an amplitude value higher than the other boundaries.

As overview, the approximating engine 300 starts at the first window boundary and adjusts an azimuth angle value and/or amplitude value. The approximating engine 300 then generates a new approximation (fit) across the entire window map based on the adjustment. By dynamically adjusting the windows, the approximating engine 300, advantageously, generates approximations that can adapt to a greater number of radiation patterns than previously handled by prior approaches.

The approximating engine 300 then calculates a "Figure-of-Merit" or FOM which measures how well the new approximation fits to the radiation pattern. The approximating engine 300 calculates the FOM across the entire window map. The approximating engine then compares the FOM with that of a prior approximation having a "best" curve fit. The approximating engine 300 replaces the prior approximation with the new approximation if the new approximation has a "better" fit than the prior approximation based on the comparison. In this way, the approximating engine 300 determines an optimal approximation.

In addition to optimizing, the approximating engine 300 resolves ambiguity by testing whether the new approximation is monotonic and has a non-zero slope in every window.

The approximating engine 300 identifies the new approximation as an "optimized monotonic fit" when the new approximation satisfies the above criteria of being optimal, monotonic, and having "minimum gradient." The approximating engine 300 repeats the foregoing with a next window boundary and iterates across all window boundaries, one at a time. The approximating engine 300 stops when it identifies an optimized monotonic fit with an FOM below a set threshold, for example.

Figure 6A:
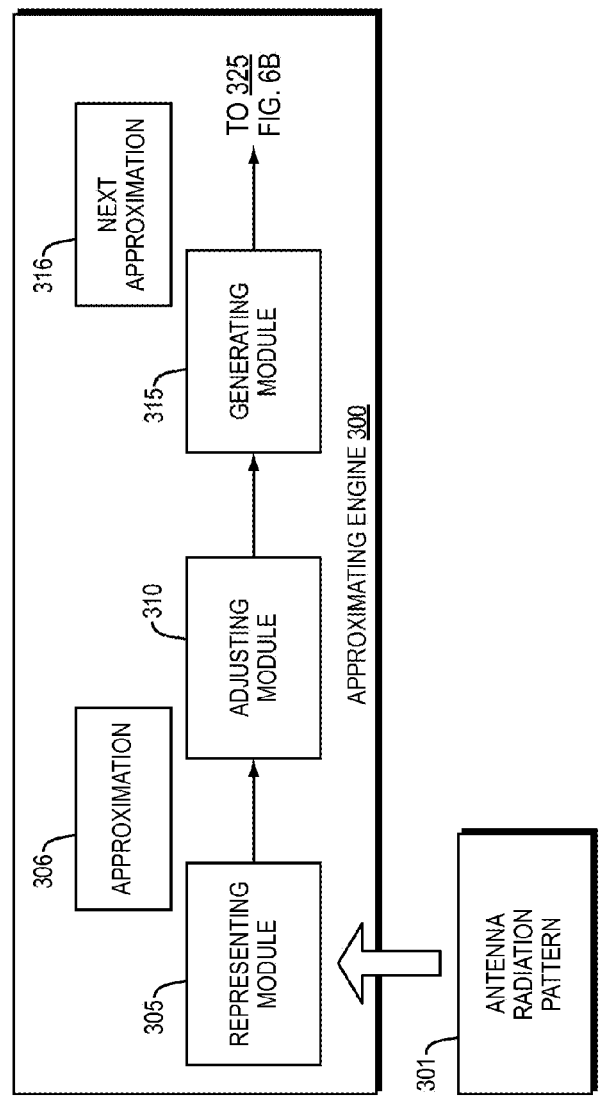
FIGS. 6A-B is a block diagram of an example approximating engine implementing the optimized monotonic fitting approach.
Figure 6B:
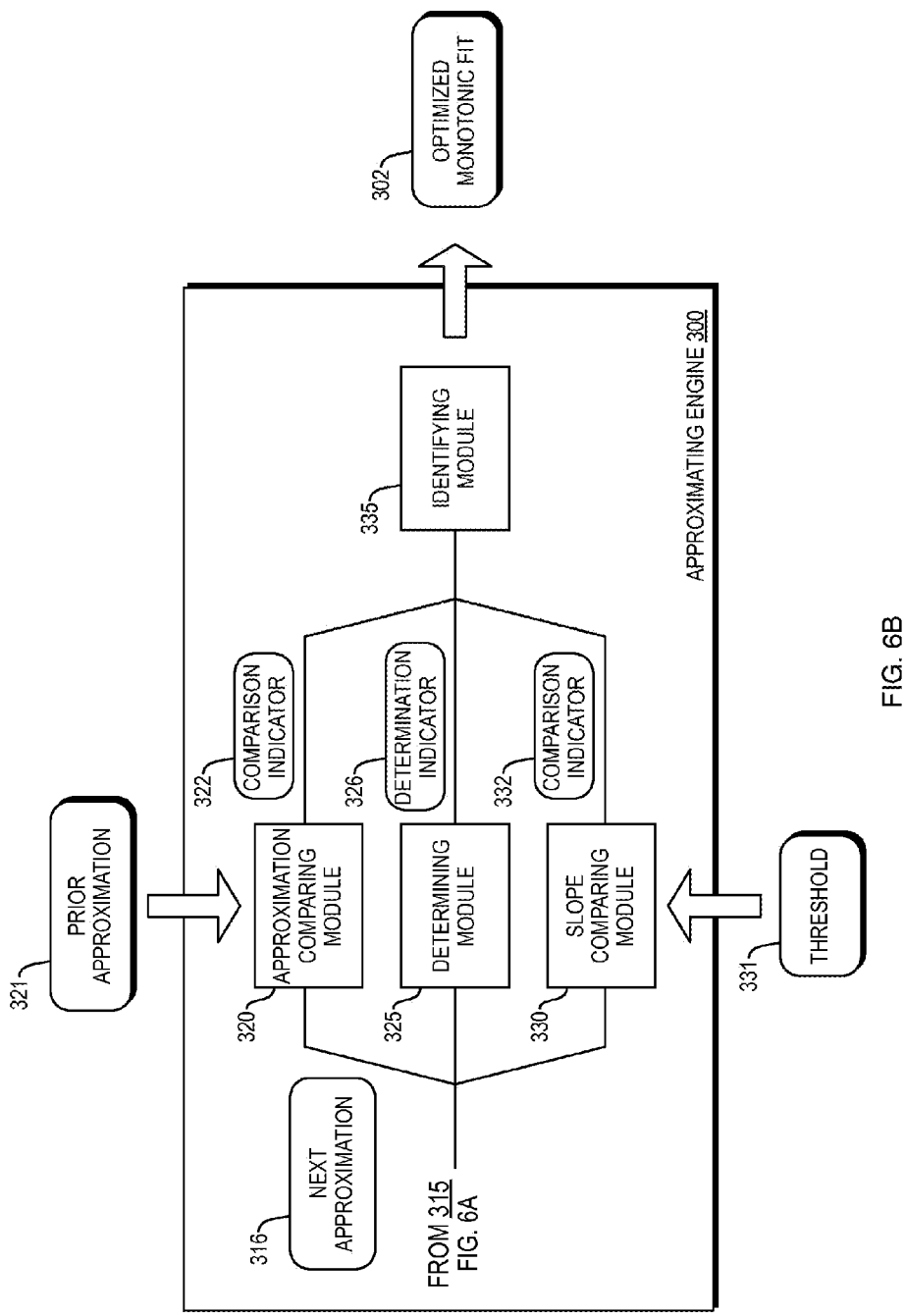

FIGS. 6A and 6B show an example of the approximating engine 300 for determining an angle of arrival of a radar signal received from an emitter. The approximating engine 300 includes a representing module 305, adjusting module 310, generating module 315, approximation comparing module 320, slope comparing module 330, determining module 325, and identifying module 335 communicatively coupled as shown in the figures. As shown, the approximating engine 300 is provided with a radiation pattern of an antenna 151.

The representing module 305 represents an approximation (fit) 306 of the radiation pattern 151 as plurality of windows. In a convenient example, each window is a portion of the overall fit that is described by specific linear coefficients. These coefficients (m, b) describe the slope (m) and y-intercept of the linear equation making up the fit within each window; the equation describing the fit is $y = m*x + b$, where y is the amplitude in decibels and x is the azimuth angle in degrees.

One example of the approximating engine 300 chooses a fitting domain based on the following two options: straight line amplitude domain selection and manual domain selection. Straight line amplitude selection restricts the fitting domain to the largest continuous pattern structure with content above the amplitude threshold. Straight line amplitude selection also attempts to locate other major pattern structures above the amplitude threshold; if other secondary pattern structures are found, the largest of these are incorporated into the fitting domain. Manual domain selection restricts the fitting domain to specified values.

Another example of the approximating engine 300 initializes the window map with two windows, one on each side of the inflection point. Each window stores the polynomial coefficients describing its curve fit (e.g., slope (m) and y-intercept (b)). The windows are initialized using linear interpolation of the pattern values located at each window boundary. The inflection point is initialized at the amplitude peak of the antenna pattern 151.

The adjusting module 310 adjusts the azimuth angle and/or the amplitude of the fit at a subject window boundary to optimize a FOM. The adjusting module 310 adjusts the azimuth angle value of a boundary between two windows "left" and "right" in increments (e.g., one degree increment) up to a specified number of "tries." In a convenient example, windows are restricted to a minimum width of one degree.

The adjusting module 310 randomizes the amplitude value of the subject boundary by a random value. An example of the adjusting module 310 calculates the random value based on a normal distribution having a mean value equal to that of the given radiation pattern and a standard deviation. The standard deviation is dependent on a magnitude of divergence of the approximation generated in the prior iteration and the given radiation pattern.

In practice, the approximating engine 300 optimizes two windows simultaneously to achieve a lowest RMS between the approximation and the radiation pattern 151. The approximating engine 300 enforces continuity between the approximation at the outer boundaries of the two windows and the approximation at the boundaries in adjacent windows. The approximating engine 300 adjusts the center boundary amplitude using a Gaussian random number generator. The random number has a mean value set to the radiation pattern value 151 and a standard deviation. The standard deviation varies depending on the magnitude of divergence of the approximation from the radiation pattern.

A convenient example of the approximating engine 300 adds a boundary between boundaries defining a window having a span of azimuth angle values greater than the other windows. This is called splitting the largest window. The approximating engine 300 splits the largest window a variable number of times during the fitting process and increases the number of windows in the window map. With more windows, the resulting fit better approximates the radiation pattern 151. Splitting the largest windows also enables the approximating engine 300 implementing the optimized monotonic approach to advantageously fit a greater variety of radiation patterns than handled by prior fitting approaches. In practice, the approximating engine 300 splits after initializing the window map or after all existing window boundaries have been optimized up to a maximum number of attempts. Convergence speed is improved by limiting the number of windows during the initial fitting process.

The generating module 315 generates a next approximation of the pattern 316 based on the adjustment to the subject boundary. For example, a new candidate window map is generated each time a boundary is randomized. One can appreciate that improved convergence speed can be obtained by limiting the number of random amplitude tries to a small value.

The approximation comparing module 320 compares the next approximation 316 to an approximation of the pattern generated in a prior iteration (prior approximation 321). In some cases, the approximation of the prior iteration is the initial approximation 306. A convenient example of approximation comparing module computes a FOM for the next approximation 316. The FOM computed is, for example, a least squares error for the next approximation 316 that is obtained by the summation of the squared difference between the next approximation 316 and the radiation pattern 151. The approximation comparing module 320 selects the next approximation 316 when the computed FOM for the next approximation 316 is smaller than a FOM computed for the approximation generated in the prior iteration (prior approximation 321). The approximation comparing module 320 finds an approximation among other approximations generated by the approximating engine 300 with the smallest FOM. In this way, the FOM is minimized and serves as the convergence criterion for the optimized monotonic approach.

The approximation comparing module 320 provides the result of the comparison as an approximation comparison indicator 322 to the identifying module 335 for processing. When the result is that the FOM of the next approximation 316 is not better than the FOM of the prior approximation (prior approximation 321), a convenient example of the approximating engine 300 determines whether a FOM convergence criterion has been meet. The criterion includes, for example, whether the FOM of the prior approximation (prior approximation 321) is below a threshold. If answered in the negative, a convenient example of the approximating engine 300 makes a series of determinations including (not necessary in order or inclusive) determining whether a maximum number of amplitude randomizations has been tried, determining whether each boundary in the window map has been tried, and determining whether a maximum number of window splits has been tried before identifying a optimized monotonic fit.

The slope comparing module 330 compares a slope associated with a portion of the next approximation 316 represented by each window to a non-zero threshold value 331. An approximation with a slope of zero means the approximation describes more than one azimuth angle value for a single amplitude value. Undesirably, such an approximation leads to multiple intercept solutions by the radar receiver system 105 (i.e., the emitter appears in different locations, momentarily). One example of the slope comparing module 330 determines whether the absolute value of a linear slope associated with each portion of the next approximation 316 is greater than the non-zero threshold value 331. By enforcing this "minimum gradient," the approximating engine 300 achieves ambiguity resolution, which in turn, avoids or at least minimizes the occurrence of multiple intercept solution errors by the radar receiver system 105. One can appreciate that adjusting the non-zero threshold value 331 varies the degree of ambiguity resolution.

The slope comparing module 330 provides the result of the comparison as a slope comparison indicator 332 to the identifying module 335 for processing. When the result is that the slope of the next approximation 316 does not exceed a minimum gradient, a convenient example of the approximating engine 300 adjusts the subject boundary (or other selected boundary) by randomizing the amplitude value and generates another approximation, as described above. Again, the approximating engine 300 enforces a minimum gradient and achieves, beneficially, ambiguity resolution.

The determining module 325 determines whether the next approximation 316 is constantly increasing on one side of the inflexion point and constantly decreasing on the other side of the inflexion point. The inflexion point of the approximation is defined as the boundary having an amplitude value higher than the other boundaries. Mathematically speaking, the inflexion point is where the slope of a tangent line to the approximation changes sign. An approximation that is constantly increasing and constantly decreasing about an inflexion point is said to be monotonic. The approximating engine 300 enforces monotonicity, along with the minimum gradient, of the window map to achieve ambiguity resolution.

The determining module 325 provides the result of the determination as a determination indicator 326 to the identifying module 335 for processing. When the result is that the next approximation 316 is not monotonic, a convenient example of the approximating engine 300 adjusts the subject boundary (or other selected boundary) by randomizing the amplitude value and generates another approximation, as described above. Again, the approximating engine 300 enforces monotonicity and achieves, beneficially, ambiguity resolution.

The identifying module 335 identifies the next approximation 316 as an optimized monotonic fit 302 based on the approximation comparison indicator 322, slope comparison indicator 332, and determination indicator 326. As described above, each of these indicators serves as convergence criterion for identifying the next approximation 316 as an optimized monotonic fit 302. One example of the approximating engine 300 stops the fitting process described above and returns an approximation as the optimized monotonic fit 302 when FOM of the approximation is less than a threshold or a maximum number of window splits have occurred. In another example, when FOM threshold is not reached, the approximating engine 300 stops the fitting process described above and returns an approximation as the optimized monotonic fit 302 upon achieving a maximum number of window splits.

Figure 9:
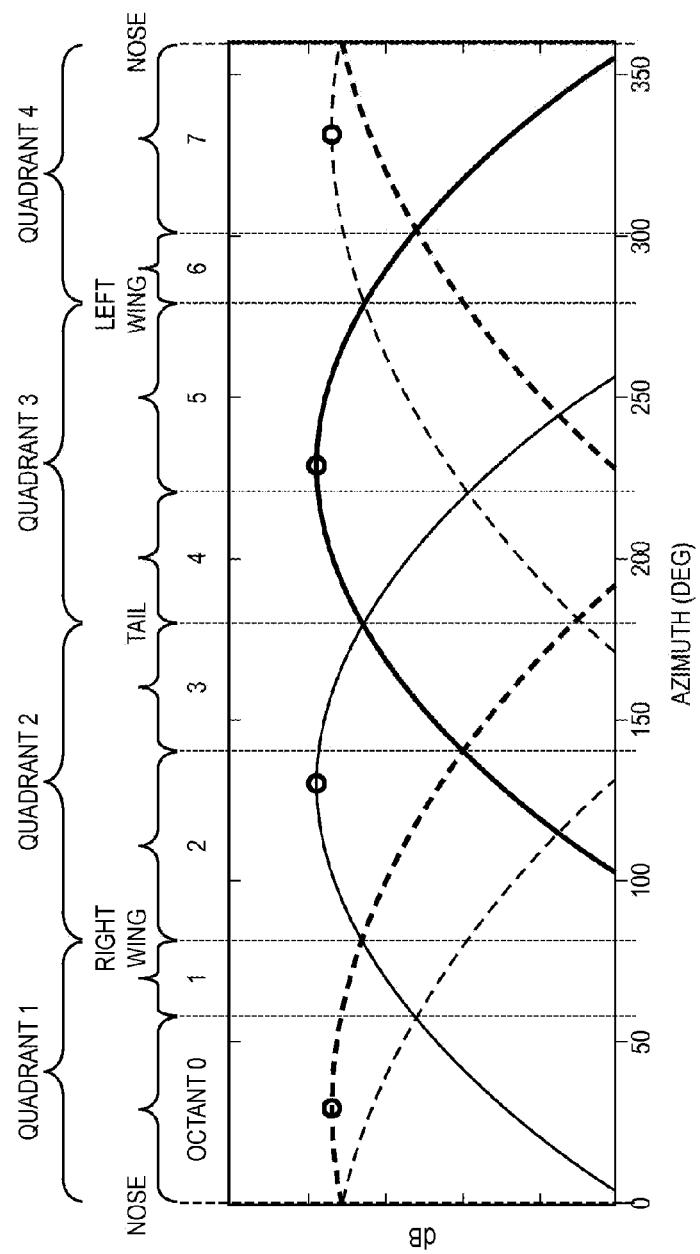
FIG. 9 is a chart showing quadrants and octants using ideal Gaussian patterns.

The radar receiver system 105 calculates an angle of arrival of the radar signal received from the emitter based on the optimized monotonic fit. Before describing the calculation process, the terms quadrants and octants are defined by crossovers in the radiation patterns of the four radar receiver system antennas. (An example of quadrants and octants using ideal Gaussian patterns is illustrated in FIG. 9.)

With reference to FIG. 10A, a convenient example of the approximating engine 300 creates a difference table by calculating the absolute value of the difference between the optimized monotonic fits of any two adjacent antennas. The difference, when expressed in decibel units, is a ratio; hence, the difference can be called an optimized monotonic fit ratio. Each optimized monotonic fit ratio is indexed in the difference table by quadrants and octants of a respective pair of adjacent antennas. In some examples, the difference table is loaded at the factory. The radar receiver system 105 then uses the difference table to calculate the angle of arrival of a radar signal from an emitter.

Figure 10B:
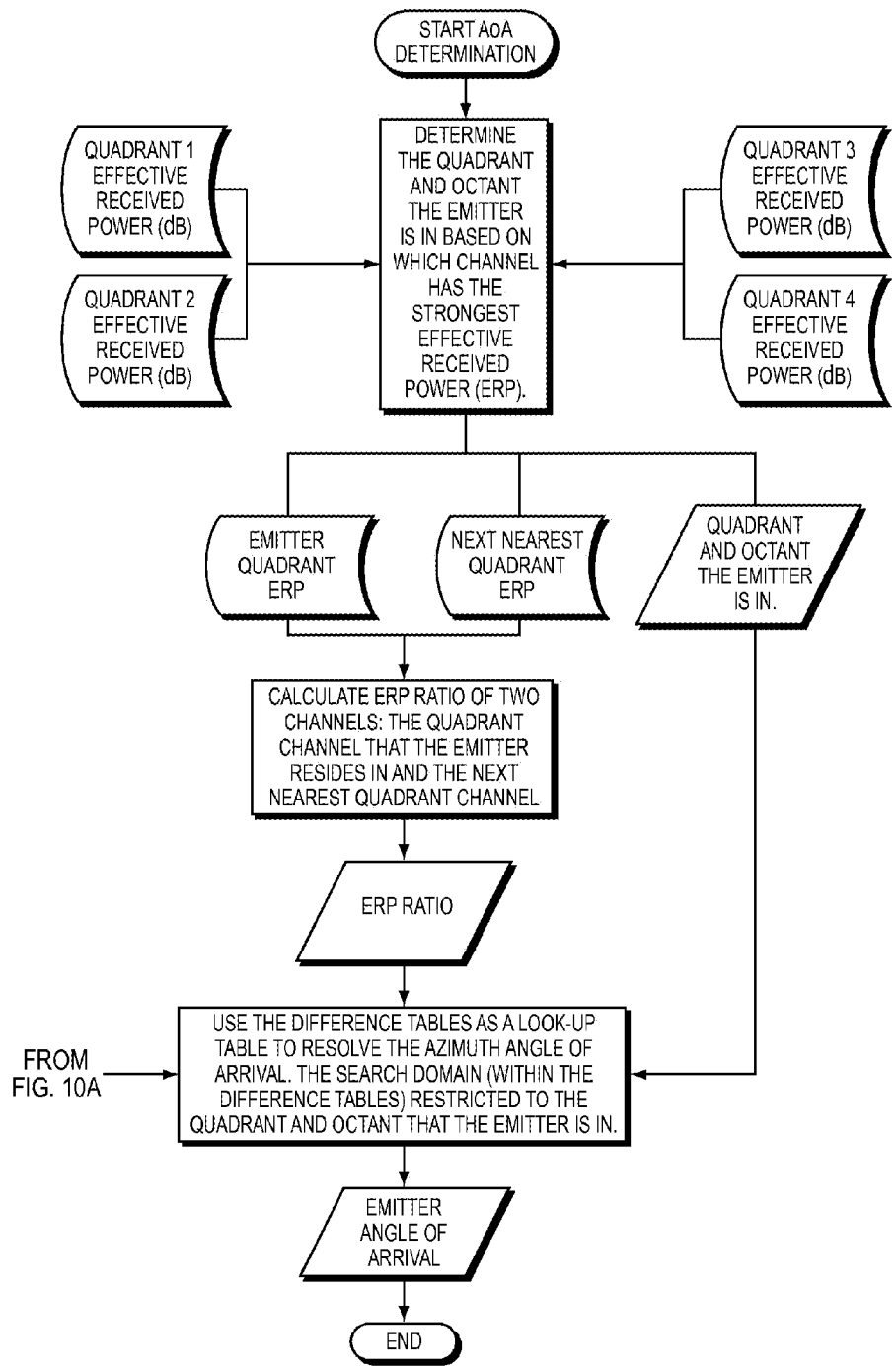

With reference to FIG. 10B, to calculate the angle of arrival of the radar signal, the radar receiver system 105 determines, roughly, in which quadrant and octant is the emitter. This is done by comparing all four quadrant channels to determine which one has the highest Effective Received Power (ERP). Once the quadrant and octant are known, the radar receiver system 105 compares the Emitter Quadrant channel and the Next Nearest Quadrant channel, and an ERP ratio of the two channels is calculated (which is a difference of the two ERPs when expressed in decibel units).

The radar receiver system 105 uses the emitter quadrant and octant to lookup a corresponding optimized monotonic fit ratio in the difference table. The radar receiver system 105 than compares the ERP ratio against optimized monotonic fit ratio and resolves the angle of arrival. The radar receiver system 105 outputs an emitter angle of arrival in the azimuth plane.

Figure 7A:
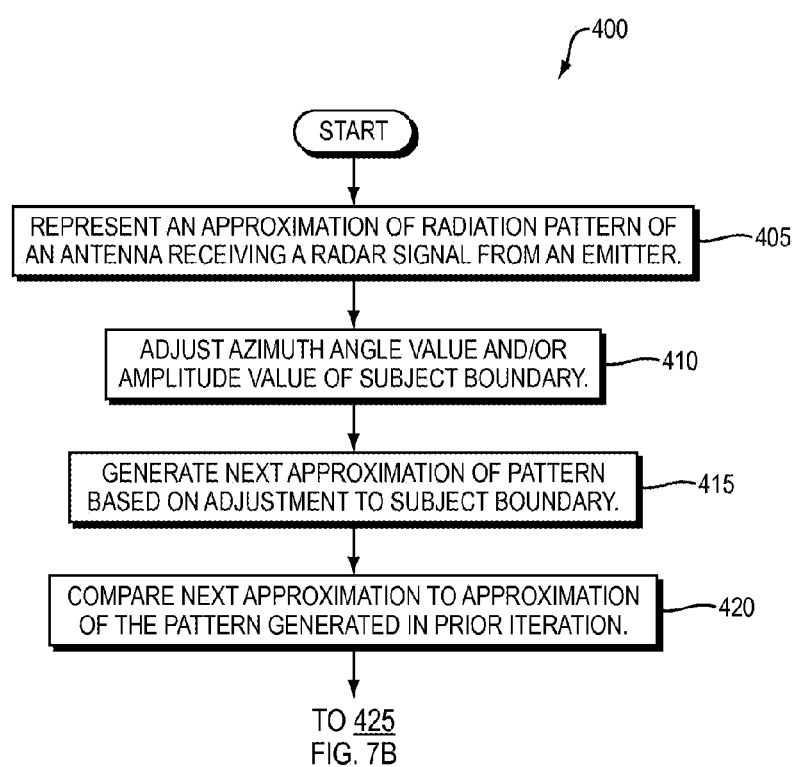
FIGS. 7A-B is a flowchart of an example procedure performed by the radar receiver system.
Figure 7B:
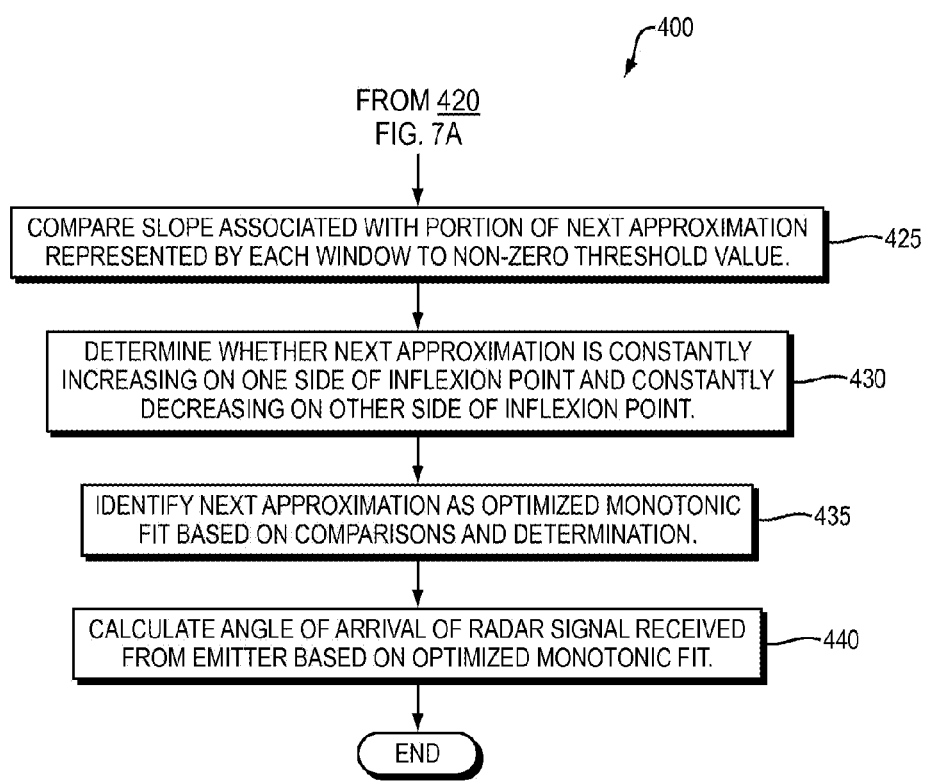

FIGS. 7A and 7B show an example procedure 400 for determining an angle of arrival of a radar signal received from an emitter. The procedure 400 is performed by the radar receiver system 105. The radar receiver system 105 is provided with a radiation pattern of an antenna receiving a radar signal from an emitter The procedure 400, in an initial iteration, represents (405) an approximation of the pattern as plurality of windows. Each window is defined by two boundaries and each of the boundaries having an azimuth angle value and an amplitude value. The approximation further includes an inflexion point being a boundary having an amplitude value higher than the other boundaries.

For each of the boundaries, the procedure 400 adjusts (410) a respective azimuth angle value and/or amplitude value of a subject boundary. The procedure 400 generates (415) a next approximation of the pattern based on the adjustment to the subject boundary.

The procedure 400 compares (420) the next approximation to an approximation of the pattern generated in a prior iteration. The prior iteration includes the initial approximation.

The procedure 400 compares (425) a slope associated with a portion of the next approximation represented by each window to a non-zero threshold value. The procedure 400 determines (430) whether the next approximation is constantly increasing on one side of the inflexion point and constantly decreasing on the other side of the inflexion point.

The procedure 400 identifies (435) the next approximation as an optimized monotonic fit based on the comparisons and determination in steps 420-430. The procedure 400 repeats steps 410-425 for each of the boundaries. The procedure 400 stops the foregoing when the FOM of the approximation is less than a threshold or a maximum number of window splits have occurred, as described above The procedure 400 calculates (440) an angle of arrival of the radar signal received from the emitter based on the optimized monotonic fit.

Figure 8:
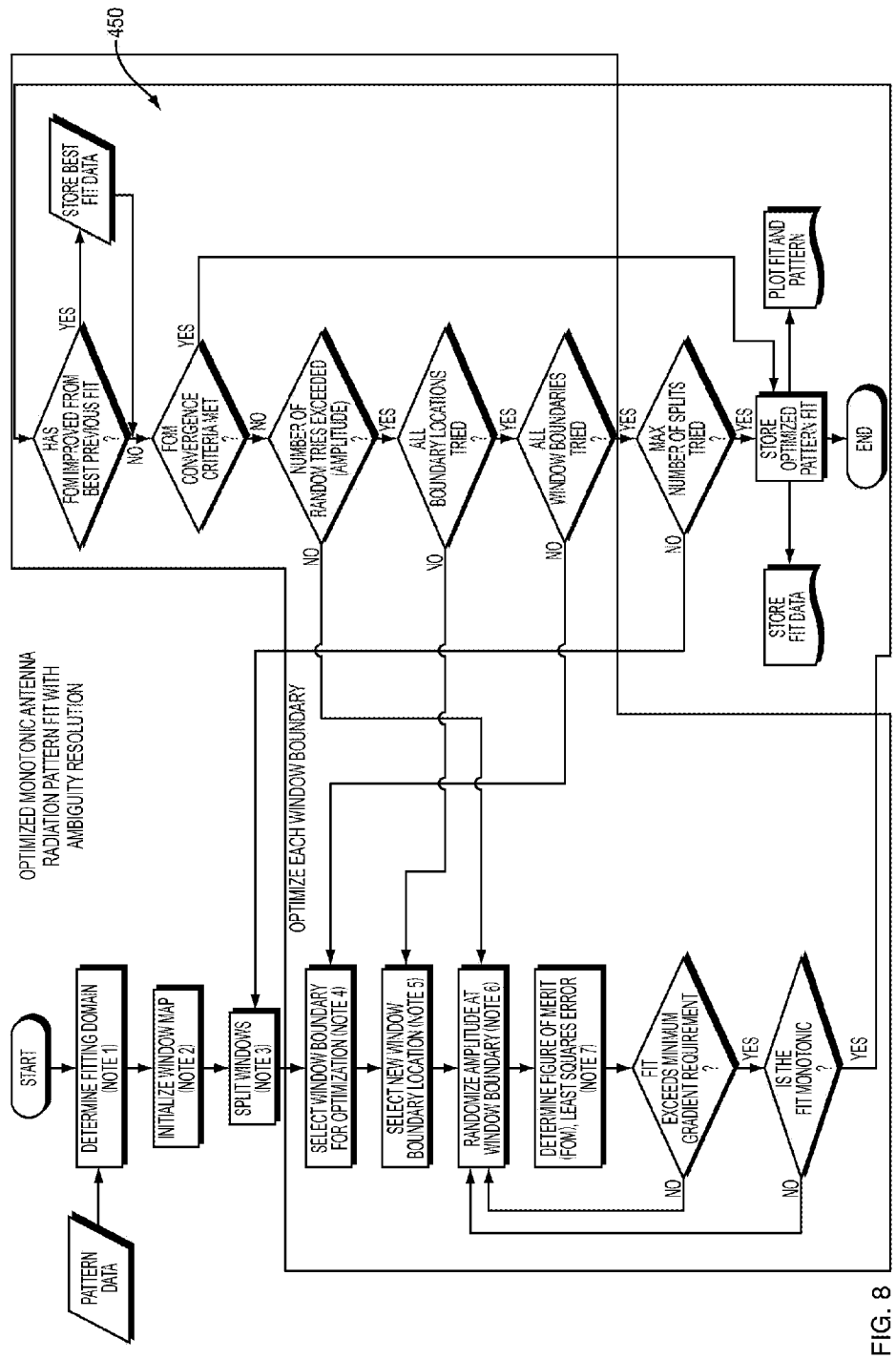
FIG. 8 is a flowchart of another example procedure performed by the radar receiver system.

FIG. 8 shows another example procedure 450 for determining an angle of arrival of a radar signal received from an emitter. The procedure 450 is performed by the radar receiver system 105.

The above-described systems and methods can be implemented in digital electronic circuitry, in computer hardware, firmware, and/or software. The implementation can be as a computer program product (i.e., a computer program tangibly embodied in an information carrier medium). The implementation can, for example, be in a machine-readable storage device for execution by, or to control the operation of, data processing apparatus. The implementation can, for example, be a programmable processor, a computer, and/or multiple computers.

In one example, a computer program can be written in any form of programming language, including compiled and/or interpreted languages, and the computer program can be deployed in any form, including as a stand-alone program or as a subroutine, element, and/or other unit suitable for use in a computing environment to carry out the features and functions of various examples discussed herein. A computer program can be deployed to be executed on one computer or on multiple computers at one site.

Method steps or operations can be performed as processes by one or more programmable processors executing a computer program to perform functions of various examples by operating on input data and generating output. Method steps can also be performed by and an apparatus can be implemented as special purpose logic circuitry. The circuitry can, for example, be a field programmable gate array (FPGA) and/or an application specific integrated circuit (ASIC). Modules, subroutines, and software agents can refer to portions of the computer program, the processor, the special circuitry, software, and/or hardware that implements that functionality.

The radar receiver system 105/approximating engine 300 may comprise one or more processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., magnetic, magneto-optical disks, or optical disks). The memory may be a tangible non-transitory computer-readable storage medium having computer-readable instructions stored therein for processing images, which when executed by one or more processors (e.g., radar receiver system 105/approximating engine 300) cause the one or more processors to carry out or implement the features and functionalities of various examples discussed herein.

Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described systems and techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system may be coupled to and/or include clients and servers. A client and a server are generally remote from each other and typically interact through a communication network. The relationship of client and server arises by virtue of computer programs running on the respective computing devices and having a client-server relationship to each other.

Communication networks may include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device in radar receiver system 105 may include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., INTERNET EXPLORER® available from Microsoft Corporation, of Redmond, Wash.). The mobile computing device includes, for example, a BLACKBERRY® provided by Research In Motion Limited of Waterloo, Ontario, Canada.

"Comprise," "include," and/or plural forms of each are open ended and include the listed parts and can include additional parts that are not listed. "And/or" is open ended and includes one or more of the listed parts and combinations of the listed parts.

Although the above disclosure discusses what is currently considered to be a variety of useful examples, it is to be understood that such detail is solely for that purpose, and that the appended claims are not limited to the disclosed examples, but, on the contrary, are intended to cover modifications and equivalent arrangements that are within the spirit and scope of the appended claims.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method of operating a radar receiver system implemented as a processor for determining an angle of arrival of a radar signal received from an emitter at an antenna, the method comprising:

given a radiation pattern of the antenna, in an initial iteration, representing an approximation of the pattern as a plurality of windows, each window defined by two boundaries and each of the boundaries having an azimuth angle value and an amplitude value, the approximation further includes an inflexion point being a boundary having an amplitude value higher than the other boundaries;

for each of the boundaries, adjusting at least one of a respective azimuth angle value or an amplitude value of a subject boundary;

generating a next approximation of the pattern based on the adjustment to the subject boundary;

comparing the next approximation to an approximation of the pattern generated in a prior iteration, which includes the initial approximation;

comparing a slope associated with a portion of the next approximation represented by each window to a non-zero threshold value;

determining whether the next approximation is constantly increasing on one side of the inflexion point and constantly decreasing on the other side of the inflexion point;

identifying the next approximation as an optimized monotonic fit based on the comparisons and determination; and calculating the angle of arrival of the radar signal based on the optimized monotonic fit.

2. The method of claim 1 wherein adjusting includes increasing or decreasing the azimuth angle value of the subject boundary by a fixed value.

3. The method of claim 1 wherein adjusting includes randomizing the amplitude value of the subject boundary by a random value.

4. The method of claim 3 further comprising calculating the random value based on a normal distribution having a mean value equal to that of the given radiation pattern and a standard deviation, the standard deviation dependent on a magnitude of divergence of the approximation generated in the prior iteration and the given radiation pattern.

5. The method of claim 1 wherein comparing the next approximation of the pattern further includes:
    computing a least squares error for the next approximation; and
    selecting the next approximation when the computed least squares error for the next approximation is smaller than a least squares error for the approximation generated in the prior iteration.

6. The method of claim 1 wherein comparing the slope includes determining whether the slope associated with each portion of the next approximation is greater than the non-zero threshold value.

7. The method of claim 1 wherein identifying includes returning, as the optimized monotonic fit, the next approximation having a least squares error that is less than a threshold.

8. The method of claim 1 further comprising adding a boundary between boundaries defining a window having a span of azimuth angle values greater than other windows.

9. The method of claim 8 wherein identifying includes returning, as the optimized monotonic fit, the next approximation having a maximum number of boundaries added.

10. The method of claim 1 wherein calculating the angle of arrival includes:
    given radiation patterns of two adjacent antennas, comparing a ratio of optimized monotonic fits of the radiation patterns and a ratio of an effective received power from each of two adjacent antennas; and
    resolving the angle of arrival based on the comparison of ratios.

11. The method of claim 1 wherein calculating the angle of arrival of the radar signal further includes:
    given adjacent antennas having a first radiation pattern and a second radiation pattern, populating a difference table, directly, with a ratio of a first optimized monotonic fit of the first radiation pattern and a second optimized monotonic fit of the second radiation pattern; and
    calculating the angle of arrival of the radar signal based on the difference table.

12. The method of claim 1 further comprising determining a location of the emitter based on the angle of arrival of the radar signal.

13. A radar receiver system for determining an angle of arrival of a radar signal received from an emitter at an antenna, the system comprising:
    a memory having computer executable instructions stored thereupon;
    at least one interface receiving a radiation pattern of the antenna;
    a processor communicatively coupled to the memory and the at least one interface, the processor configured to execute the computer executable instructions to:
        in an initial iteration, represent an approximation of the received radiation pattern as a plurality of windows, each window defined by two boundaries and each of the boundaries having an azimuth angle value and an amplitude value, the approximation further includes an inflexion point being a boundary having an amplitude value higher than the other boundaries;
        for each of the boundaries, adjust at least one of a respective azimuth angle value or amplitude value of a subject boundary;
        generate a next approximation of the pattern based on the adjustment to the subject boundary;
        compare the next approximation to an approximation of the pattern generated in a prior iteration, which includes the initial approximation;
        compare a slope associated with a portion of the next approximation represented by each window to a non-zero threshold value;
        determine whether the next approximation is constantly increasing on one side of the inflexion point and constantly decreasing on the other side of the inflexion point;
        identify the next approximation as an optimized monotonic fit based on the comparisons and determination; and
        calculate the angle of arrival of the radar signal based on the optimized monotonic fit.

14. The system of claim 13 wherein the processor is further configured to execute the computer readable instructions to determine a location of the emitter based on the angle of arrival of the radar signal.

15. A tangible non-transitory computer-readable storage medium having computer readable instructions stored therein that when executed by a processor implements a method of determining an angle of arrival of a radar signal received from an emitter at an antenna, comprising:
    given a radiation pattern of the antenna, in an initial iteration, representing an approximation of the pattern as a plurality of windows, each window defined by two boundaries and each of the boundaries having an azimuth angle value and an amplitude value, the approximation further including an inflexion point being a boundary having an amplitude value higher than the other boundaries;
    for each of the boundaries, adjusting at least one of a respective azimuth angle value or amplitude value of a subject boundary;
    generating a next approximation of the pattern based on the adjustment to the subject boundary;
    comparing the next approximation to an approximation of the pattern generated in a prior iteration, which includes the initial approximation;
    comparing a slope associated with a portion of the next approximation represented by each window to a non-zero threshold value;
    determining whether the next approximation is constantly increasing on one side of the inflexion point and constantly decreasing on the other side of the inflexion point;
    identifying the next approximation as an optimized monotonic fit based on the comparisons and determination; and
    calculating the angle of arrival of the radar signal based on the optimized monotonic fit.

16. The non-transitory computer-readable storage medium of claim 15 wherein the computer readable instructions stored therein, when executed by the processor, also determine a location of the emitter based on the angle of arrival of the radar signal.

\* \* \* \* \*